United States Patent
Puri et al.

(10) Patent No.: US 12,334,118 B2
(45) Date of Patent: Jun. 17, 2025

(54) TECHNIQUES FOR IDENTIFYING SYNCHRONIZATION ERRORS IN MEDIA TITLES

(71) Applicant: NETFLIX, INC., Los Gatos, CA (US)

(72) Inventors: Rohit Puri, Campbell, CA (US); Naji Khosravan, Orlando, FL (US); Shervin Ardeshir Behrostaghi, Campbell, CA (US)

(73) Assignee: NETFLIX, INC., Los Gatos, CA (US)

( * ) Notice: Subject to any disclaimer, the term of this patent is extended or adjusted under 35 U.S.C. 154(b) by 46 days.

(21) Appl. No.: 16/687,209

(22) Filed: Nov. 18, 2019

(65) Prior Publication Data

US 2020/0160889 A1   May 21, 2020

Related U.S. Application Data

(60) Provisional application No. 62/769,515, filed on Nov. 19, 2018.

(51) Int. Cl.
*G11B 27/36* (2006.01)
*G06F 18/2433* (2023.01)
(Continued)

(52) U.S. Cl.
CPC .......... *G11B 27/36* (2013.01); *G06F 18/2433* (2023.01); *G06N 3/045* (2023.01);
(Continued)

(58) Field of Classification Search
CPC .. G11B 27/36; G06K 9/00744; G06K 9/6284; G06N 3/0454; G06N 3/08; G10L 25/30; G10L 25/57
See application file for complete search history.

(56) References Cited

U.S. PATENT DOCUMENTS 5,430,485 A   7/1995   Lankford et al.
6,122,668 A   9/2000   Teng et al.
(Continued)

FOREIGN PATENT DOCUMENTS

WO   2016/100814 A1   6/2016

OTHER PUBLICATIONS

International Search Report for application No. PCT/US2019/062240 dated Feb. 14, 2020.
(Continued)

*Primary Examiner* — Sunghyoun Park
(74) *Attorney, Agent, or Firm* — Artegis Law Group, LLP

(57) ABSTRACT

A neural network system that is trained to identify one or more portions of a media title where synchronization errors are likely to be present. The neural network system is trained based on a first set of media titles where synchronization errors are present and a second set of media titles where synchronization errors are absent. The second set of media titles can be generated by introducing synchronization errors into a set of media titles that otherwise lack synchronization errors. Via training, the neural network system learns to identify specific visual features included in one or more video frames and corresponding audio features that should be played back in synchrony with the associated visual features. Accordingly, when presented with a media title that includes synchronization errors, the neural network can indicate the specific frames where synchronization errors are likely to be present.

21 Claims, 8 Drawing Sheets

(51) Int. Cl.

| | |
|---|---|
| *G06N 3/045* | (2023.01) |
| *G06N 3/08* | (2023.01) |
| *G06V 10/764* | (2022.01) |
| *G06V 10/82* | (2022.01) |
| *G06V 20/40* | (2022.01) |
| *G10L 25/30* | (2013.01) |
| *G10L 25/57* | (2013.01) |

(52) U.S. Cl.
CPC ............. *G06N 3/08* (2013.01); *G06V 10/764* (2022.01); *G06V 10/82* (2022.01); *G06V 20/41* (2022.01); *G06V 20/46* (2022.01); *G10L 25/30* (2013.01); *G10L 25/57* (2013.01)

(56) References Cited

U.S. PATENT DOCUMENTS

| | | | | |
|---|---|---|---|---|
| 9,836,853 | B1* | 12/2017 | Medioni | G06T 7/246 |
| 2008/0193016 | A1* | 8/2008 | Lim | G06F 16/7834 |
| | | | | 382/190 |
| 2012/0033949 | A1 | 2/2012 | Lu et al. | |
| 2013/0089204 | A1* | 4/2013 | Kumar | H04B 10/70 |
| | | | | 380/256 |
| 2014/0116231 | A1* | 5/2014 | Leflore | G09B 15/023 |
| | | | | 84/466 |
| 2016/0314789 | A1 | 10/2016 | Marcheret et al. | |
| 2017/0177972 | A1* | 6/2017 | Cricri | G06N 3/0445 |
| 2017/0178346 | A1 | 6/2017 | Ferro et al. | |
| 2018/0018970 | A1* | 1/2018 | Heyl | G06V 40/172 |
| 2019/0236136 | A1* | 8/2019 | Sigal | G06N 3/08 |
| 2020/0051254 | A1* | 2/2020 | Habibian | G06T 7/75 |
| 2020/0076988 | A1* | 3/2020 | Aides | G06N 3/0454 |
| 2020/0293884 | A1* | 9/2020 | Zhang | G06F 18/285 |

OTHER PUBLICATIONS

Morgado et al., "Self-Supervised Generation of Spatial Audio for 360 Video", Cornell University Library, 201, Olin Library Cornell University Ithaca, NY14853, Sep. 7, 2018, pp. 1-10.
Abolghasemi et al., "Pay attention!—Robustifying a Deep Visuomotor Policy through Task-Focused Attention", arXiv preprint arXiv:1809.10093, DOI 10.1109/CVPR.2019.00438, IEEE/CVF Conference on Computer Vision and Pattern Recognition (CVPR), 2018, pp. 4249-4257.
Bahdanau et al., "Neural Machine Translation by Jointly Learning to Align and Translate", In International Conference on Learning Representations, arXiv:1409.0473, 2015, pp. 1-15.
Chung et al., "Lip Reading Sentences in the Wild", In CVPR, 2017, pp. 3444-3453.
Chung et al., "Out of time: automated lip sync in the wild", In Asian Conference on Computer Vision, 2016, pp. 251-263.
Gemmeke et al., "Audio Set: An Ontology and Human-Labeled Dataset for Audio Events", In Acoustics, Speech and Signal Processing (ICASSP), 2017 IEEE International Conference on, 2017, pp. 776-780.
Liu et al., "RankIQA: Learning from Rankings for No-reference Image Quality Assessment", Computer Vision and Pattern Recognition, https://arxiv.org/abs/1707.08347, 2017, pp. 1040-1049.
Liu et al., "Leveraging Unlabeled Data for Crowd Counting by Learning to Rank", 2018 IEEE/CVF Conference on Computer Vision and Pattern Recognition, arXiv preprint arXiv:1803.03095, DOI 10.1109/CVPR.2018.00799, 2018, pp. 7661-7669.
Luong et al., "Effective Approaches to Attention-based Neural Machine Translation", arXiv preprint arXiv:1508.04025, 2015, 34 pages.
Marcheret et al., "Detecting Audio-Visual Synchrony Using Deep Neural Networks", In Sixteenth Annual conference of the International Speech Communication Association, Sep. 6-10, 2015, pp. 548-552.
Mazaheri et al., "Video Fill in the Blank using LR/RL LSTMs with Spatial-Temporal Attentions", 2017 IEEE International Conference on Computer Vision (ICCV), 10.1109/ICCV2017.157, 2017, pp. 1407-1416.
Noroozi et al., "Unsupervised Learning of Visual Representations by Solving Jigsaw Puzzles", In European Conference on Computer Vision, arXiv:1603.0924, 2017, pp. 69-84.
Owens et al., "Audio-Visual Scene Analysis with Self-Supervised Multisensory Features", arXiv preprint arXiv:1804.03641, 2018, pp. 1-18.
Sharma et al., "Action Recognition using Visual Attention", arXiv preprint arXiv:1511.04119, 2015, pp. 1-6.
Sukhbaatar et al., "End-To-End Memory Networks", In Advances in neural information processing systems, arXiv:1503.08895, 2015, pp. 2440-2448.
Vaswani et al., "Attention Is All You Need", In Advances in Neural Information Processing Systems, arXiv:1706.03762, 2017, pp. 5998-6008.
Weston et al., "Memory Networks", arXiv:1410.3916, ICLR 2015, 2014, pp. 1-15.
Xu et al., "Show, Attend and Tell: Neural Image Caption Generation with Visual Attention", In International Conference on Machine Learning, vol. 37, 2015, pp. 2048-2057.
Yang et al., "Stacked Attention Networks for Image Question Answering", In Proceedings of the IEEE Conference on Computer Vision and Pattern Recognition, DOI 10.1109/CVPR.2016.10, 2016, pp. 21-29.
Zang et al., Attention-Based Temporal Weighted Convolutional Neural Network for Action Recognition, In IFIP International Conference, https://doi.org/10.1007/978-3-319-92007-8_9, 2018, pp. 97-108.

* cited by examiner

TECHNIQUES FOR IDENTIFYING SYNCHRONIZATION ERRORS IN MEDIA TITLES

CROSS-REFERENCE TO RELATED APPLICATIONS

This application claims the priority benefit of U.S. provisional patent application titled, "Techniques for Audio-Visual Synchronization," filed on Nov. 19, 2018 and having Ser. No. 62/769,515. The subject matter of this related application is hereby incorporated herein by reference.

BACKGROUND

Field of the Various Embodiments

The various embodiments relate generally to computer science and media processing and, more specifically, to techniques for identifying synchronization errors in media titles.

Description of the Related Art

A video streaming service provides access to one or more libraries of media titles. A given media title typically includes separate video and audio tracks that need to be synchronized with one another during playback in order to provide a realistic and immersive user experience. For example, a video track that shows a person speaking needs to be synchronized with an audio track of the voice of that person in order to mimic the real-world experience of viewing a person that is speaking. Maintaining synchronization between video tracks and audio tracks during playback of media titles is critical to providing users with a quality viewing experience.

A "synchronization error" can occur during playback of a given media title when the video track and audio track associated with that media title are not synchronized with one another. For example, the video track could be slightly delayed during playback relative the audio track, or the audio track could be slightly delayed during playback relative the video track. Users may notice when synchronization errors occur because certain images may be displayed in conjunction with incorrect sounds and/or certain sounds may be played in conjunction with incorrect images. For example, suppose the video track displays a door closing but the audio track is slightly delayed during playback and therefore does not play the sound of the door being closed until after the door is already closed. Based on real-world experience, a user might expect these two events to occur at the same time and therefore may notice a timing discrepancy in the media title if these two events do not occur at the same time during playback of the media title. This timing discrepancy could degrade the level of immersion provided by the media title and potentially lead to a poor user experience. Accordingly, identifying synchronization errors in media titles is an important step towards providing users with a high quality viewing experience. Synchronization errors in media titles are usually identified via algorithmic techniques that have been developed to programmatically identify when synchronization errors are present in media titles. However, these algorithmic techniques suffer from at least two technical drawbacks.

First, algorithmic techniques for identifying synchronization errors do not determine specific times within a given media title when synchronization errors occur. Consequently, modifications cannot easily be made to that media title in order to correct those synchronization errors because the timing of those synchronization errors remains unknown. Second, algorithmic techniques for identifying synchronization errors are oftentimes inaccurate and therefore miss synchronization errors altogether or output a large number of false positives.

As the foregoing illustrates, what is needed in the art is a more effective technique for identifying synchronization errors in media titles.

SUMMARY

Various embodiments include a neural network system implemented by one or more computers, where the neural network system identifies one or more blocks in a media clip that include audio data that is misaligned with corresponding video data, and where the neural network system includes a convolutional subnetwork that generates, for each block included in a plurality of blocks in the media clip, a corresponding feature map derived from one or more audio features and one or more video features of the block of the media clip, an attention module that computes at least one weight value for each feature map generated for the plurality of blocks in the media clip, wherein the at least one weight value computed for each feature map indicates a likelihood that a given block of the media clip corresponding to the feature map includes audio data that is misaligned with corresponding video data, and an output layer that identifies, based on the at least one weight value computed for each feature map, a first block included in the plurality of blocks that includes first audio data that is misaligned with corresponding first video data.

At least one technical advantage of the disclosed techniques relative to the prior art is that the disclosed techniques enable the precise location of synchronizations errors within a given media title to be determined. Accordingly, synchronization errors can be more effectively corrected than is currently possible with existing algorithmic techniques for detecting synchronization errors, potentially leading to higher quality media titles and therefore higher overall user engagement.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
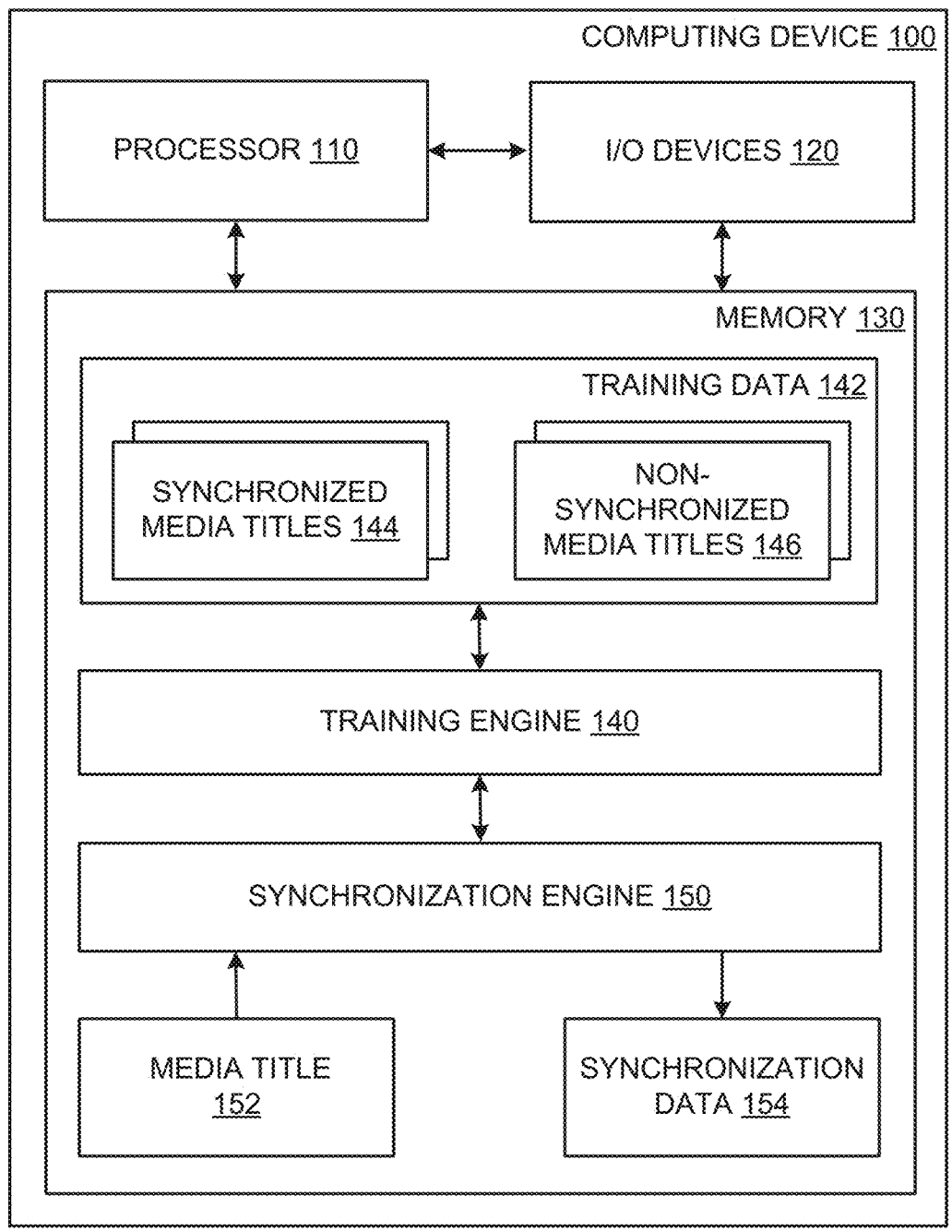
FIG. 1 illustrates a computing device configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

A video streaming service provides access to one or more libraries of media titles. A given media title typically includes separate video and audio tracks that need to be synchronized with one another during playback in order to provide a realistic and immersive user experience. Maintaining synchronization between video tracks and audio tracks during playback of media titles is critical to providing users with a high quality viewing experience and is therefore an important cornerstone in the ongoing effort to attract a growing user base. However, the process of identifying and correcting synchronization errors in media titles poses specific technical challenges.

Synchronization errors in media titles are usually identified via algorithmic techniques that programmatically identify when synchronization errors are present in media titles. These algorithmic techniques suffer from at least two technical drawbacks.

First, algorithmic techniques for identifying synchronization errors do not determine specific times within a given media title where synchronization errors occur. Consequently, modifications cannot easily be made to that media title in order to correct those synchronization errors because the timing of those synchronization errors remains unknown. Second, algorithmic techniques for identifying synchronization errors are oftentimes inaccurate and therefore miss synchronization errors altogether or output a large number of false positives.

To address the above issues, various embodiments include a neural network system that is trained to identify one or more portions of a media title where synchronization errors are likely to be present. The neural network system is trained based on a first set of media titles where synchronization errors are present and a second set of media titles where synchronization errors are absent. The second set of media titles can be generated by introducing synchronization errors into a set of media titles that otherwise lack synchronization errors. Via training, the neural network system learns to identify specific visual features included in a sequence of video frames and corresponding audio features that should be played back in synchrony with the associated visual features. Accordingly, when presented with a media title that includes synchronization errors, the neural network can indicate the specific frames where synchronization errors are likely to be present.

In addition, one variation of the disclosed neural network system learns to identify specific regions of individual video frames of a given media title that include one or more visual features that are strongly associated with particular audio features in the associated audio track. For example, the neural network system could be trained to identify a region of a frame where a basketball impacts the floor, because this particular visual feature is strongly correlated with the sound of a basketball impacting the floor. Because visual features that are strongly associated with specific audio features generally correspond to events that users typically expect to cause sounds, synchronization errors associated with these visual features can be highly noticeable to users. Visual features identified by this variation of the neural network system can be used to identify portions of a given media title where synchronization errors may be most obvious and to apply appropriate corrections.

One technical advantage of the disclosed techniques relative to the prior art is that the disclosed techniques enable the precise location of synchronizations errors within a given media title to be determined. Accordingly, synchronization errors can be more effectively corrected than is currently possible with existing algorithmic techniques for detecting synchronization errors, potentially leading to higher quality media titles and therefore higher overall user engagement. Another technical advantage of the disclosed techniques relative to the prior art is that synchronization errors can be detected with much higher accuracy than possible with current algorithmic techniques for identifying synchronization errors. Accordingly, more synchronization errors within a given media title can be identified and corrected with fewer false positives compared to existing algorithmic techniques, further improving the quality of media titles provided by the video streaming service. These technical advantages represent one or more technological advancements over prior art approaches.

System Overview

FIG. 1 illustrates a computing device 100 configured to implement one or more aspects of the various embodiments. Computing device 100 may be any technically feasible type of computer system, including a desktop computer, a laptop computer, a mobile device, a virtualized instance of a computing device, a distributed and/or cloud-based computer system, and so forth.

As shown, computing device 100 includes processor 110, input/output (I/O) devices 120, and a memory 130, coupled together. Processor 110 includes any technically feasible set of hardware units configured to process data and execute software applications. For example, processor 110 could include one or more central processing units (CPUs). I/O devices 120 include any technically feasible set of devices configured to perform input and/or output operations, including, for example, a display device, a keyboard, and a touchscreen, among others. Memory 130 includes any technically feasible storage media configured to store data and software applications, such as, for example, a hard disk, a random-access memory (RAM) module, and a read-only memory (ROM).

Memory 130 includes a training engine 140 and a synchronization engine 150. Training engine 140 and synchronization engine 150 are software applications that, when executed by processor 110, perform various operations. In particular, training engine 140 is configured to train synchronization engine 150 to identify synchronization errors in media titles. As referred to herein, a "synchronization error" corresponds to a temporal misalignment between video data and audio data (i.e. audiovisual data) associated with a given media title.

Training engine 140 trains synchronization engine 150 based on training data 142. Training data 142 includes synchronized media titles 144 and non-synchronized media titles 146. Synchronized media titles 144 includes audiovisual data that does not include synchronization errors. Non-synchronized media titles 146 include audiovisual data that includes synchronization errors. Training engine 140 can generate a given non-synchronized media title 146 by introducing one or more synchronization errors into a given synchronized media title 144. For example, training engine 140 could introduce a delay in audio data associated with a given synchronized media title 144 in order to cause that audio data to be temporally misaligned relative to corresponding video data associated with the given synchronized media title 144. Training engine 140 can implement any technically feasible training procedure and/or any technically feasible set of loss functions in order to adjust various weight values included in synchronization engine 150 based on training data 142.

Once trained, synchronization engine 150 is configured to analyze individual audiovisual blocks within a media title 152 to generate synchronization data 154. As referred to herein, an "audiovisual block" generally includes one or more frames of video data and corresponding audio data. Synchronization data 154 can indicate audiovisual blocks included in media title 152 where synchronization errors are likely to be present. Synchronization data 154 can also indicate specific regions of video frames of audiovisual blocks included in media title 152 where synchronization errors are likely to be present. Further, synchronization data 154 can quantify the degree of misalignment between video data and audio data within media title 152. The architecture and functionality of synchronization engine 150 is described in greater detail below in conjunction with FIGS. 2-8.

Network Architecture

Figure 2:
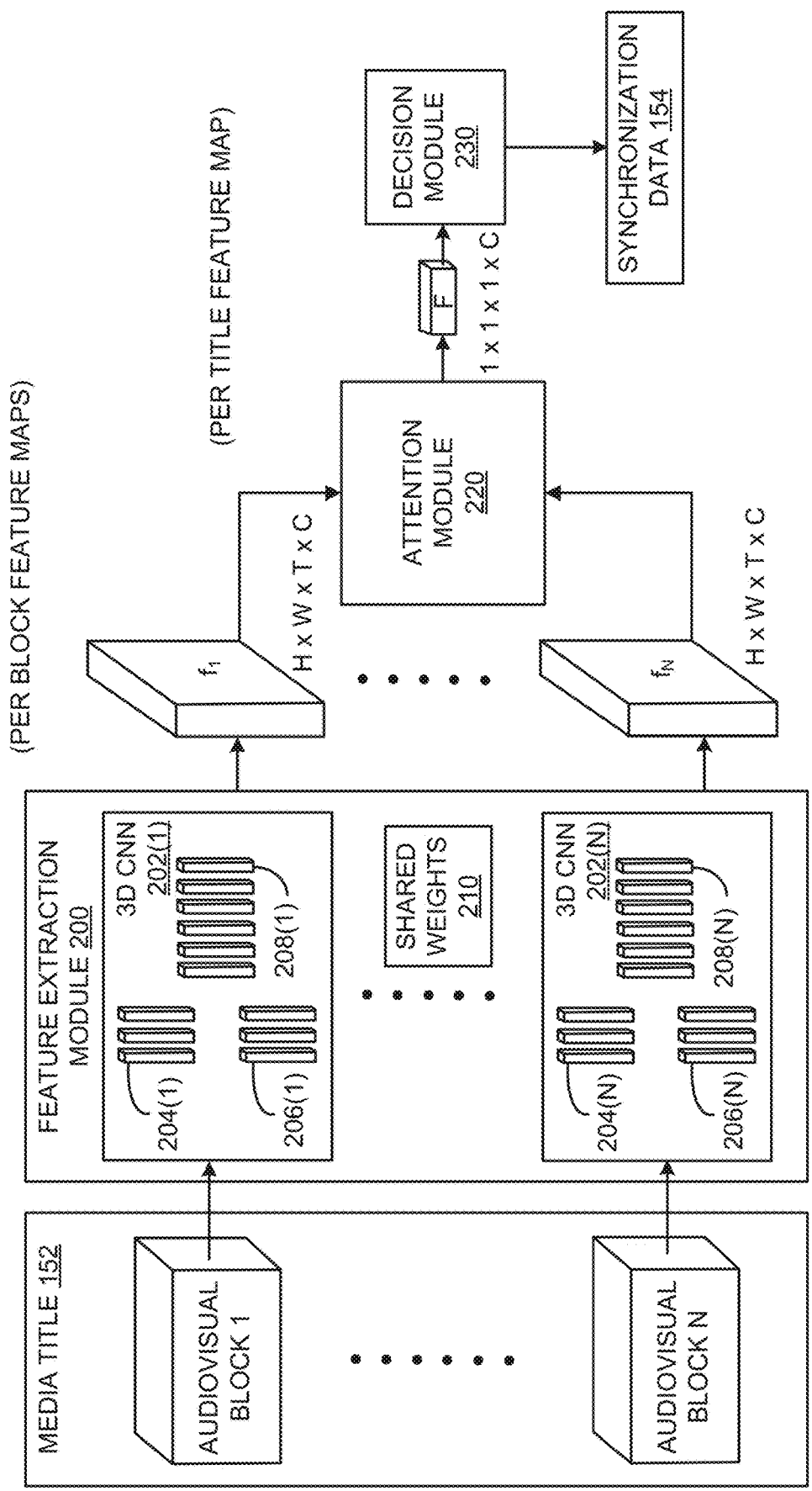
FIG. 2 is a more detailed illustration of the synchronization engine of FIG. 1, according to various embodiments.

FIG. 2 is a more detailed illustration of synchronization engine 150 of FIG. 1, according to various embodiments. As shown, synchronization engine 150 includes a feature extraction module 200, an attention module 220, and a decision module 230. Feature extraction module 200 includes three-dimensional (3D) convolutional neural networks (CNNs) 202(1) through 202(N) that collectively implement a set of shared weights 210. Each 3D CNN 202 includes one or more audio feature extraction layers 204, one or more video feature extraction layers 206, and one or more joint audio/video feature extraction layers 208. In one embodiment, a given 3D CNN 202 may include three audio feature extraction layers 204, three video extraction layers 206, and five joint audio/video feature extraction layers 208.

In operation, each 3D CNN 202(1) through 202(N) processes a different audiovisual block 1 through N included in media title 152 to generate a different feature map $f_1$ through $f_N$, as is shown. As mentioned above, a given audiovisual block generally includes one or more frames of video data and corresponding audio data.

When processing an audiovisual block, a given 3D CNN 202 implements audio feature extraction layers 204 to extract audio features from audio data included in the audiovisual block. The given 3D CNN 202 also implements video feature extraction layers 206 to extract a set of video features from video data included in the audiovisual block. The given 3D CNN 202 concatenates the audio features with the video features across channels and then implements joint audio/video feature extraction layers 208 to combine the two types of features and generate a feature map f.

As is shown, 3D CNN 202(1) processes audiovisual block 1 via audio feature extraction layers 204(1), video feature extraction layers 206(1), and joint audio/video feature extraction layers 208(1) to generate feature map $f_1$. Similarly, 3D CNN 202(N) processes audiovisual block N via audio feature extraction layers 204(N), video feature extraction layers 206(N), and joint audio/video feature extraction layers 208(N) to generate feature map $f_N$.

A given feature map f may have dimensions equal to H×W×T×C, where H corresponds to a height value associated with a frame of video data included in an audiovisual block, W corresponds to a width value associated with a frame of video data included in an audiovisual block, T corresponds to a number of audio and/or video frames associated with the audiovisual block and/or the duration of the audiovisual block, and C corresponds to a collective number of joint audio/video features.

Attention module 220 processes feature maps $f_1$ through $f_N$ to generate a global feature vector F that represents a collective set of joint audio/video features included in media title 152. In one embodiment, attention module 220 may be configured to identify joint audio/video features associated with synchronization errors across audiovisual blocks, as described in greater detail below in conjunction with FIGS. 3-5. In another embodiment, attention module 220 may be configured to identify joint audio/video features associated with synchronization errors within video frames of audiovisual blocks, as described in greater detail below in conjunction with FIGS. 6-8. In either embodiment, attention module 220 generates feature vector F with dimensions equal to 1×1×1×C, where C, as mentioned above, corresponds to a collective number of joint audio/video features. The value of C may vary across different embodiments.

Figure 3:
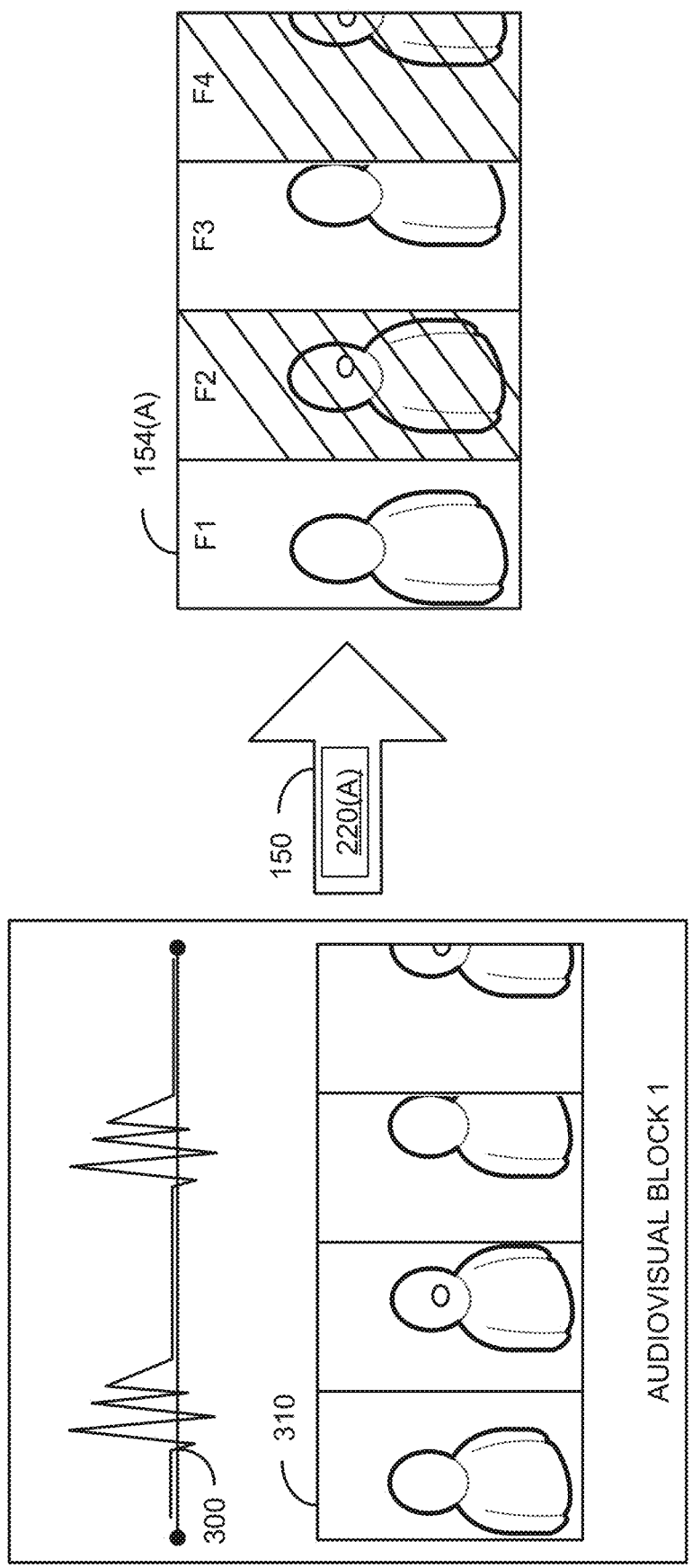
FIG. 3 illustrates how a first implementation of the attention module of FIG. 2 can be used to identify audio-visual blocks where synchronization errors occur, according to one embodiment.
Figure 6:
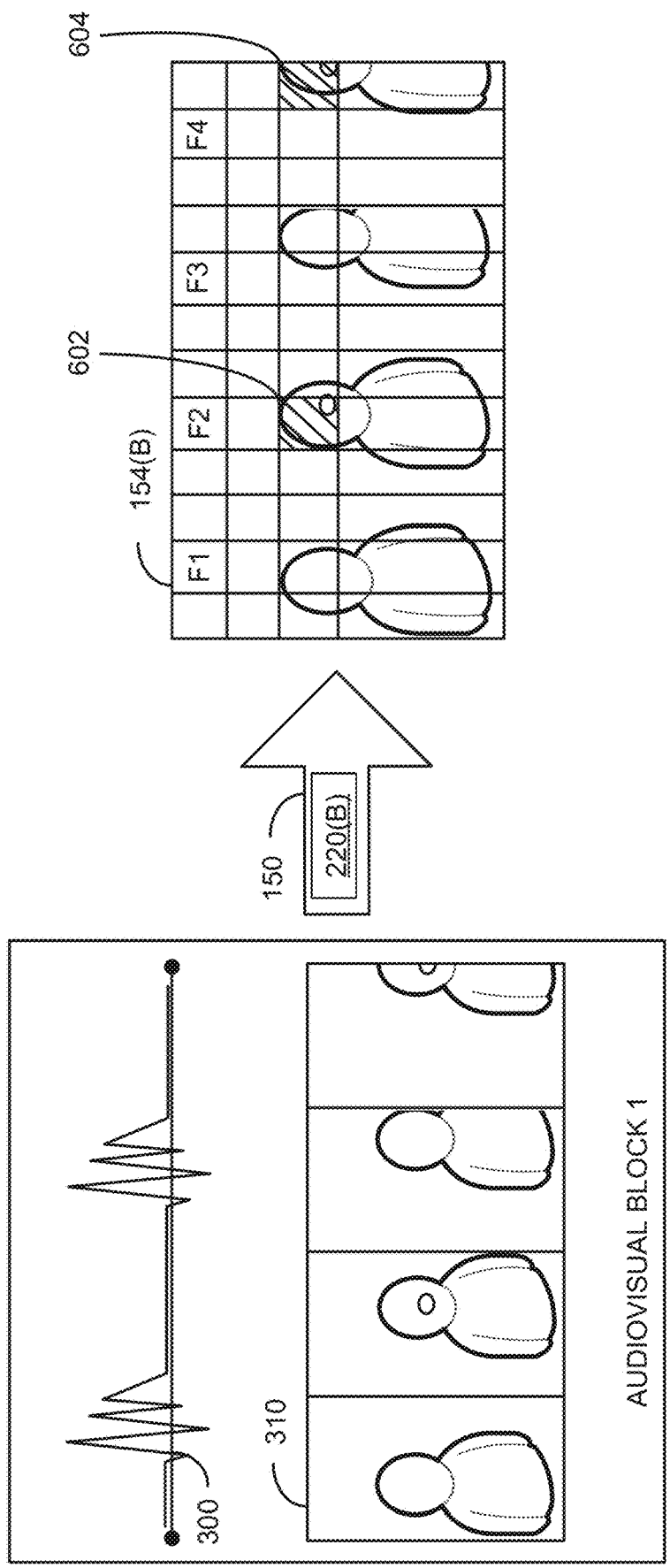
FIG. 6 illustrates how a second implementation of the attention module of FIG. 2 can be used to identify regions of video frames where synchronization errors occur, according to another embodiment.

Decision module 230 analyzes feature vector F and determines specific joint audio/video features that likely correspond to synchronization errors within media title 152. When attention module 220 is configured to identify relevant joint-audio video features across audiovisual blocks, decision module 230 generates synchronization data 154 to indicate the particular audiovisual blocks where synchronization errors are likely to be present, as depicted in FIG. 3. When attention module 220 is configured to identify relevant joint-audio video features within frames of audiovisual blocks, decision module 230 generates synchronization data 154 to indicate specific regions of video frames of audiovisual blocks where synchronization errors are likely to be present, as depicted in FIG. 6. In either implementation, decision module 230 can also generate synchronization data 154 to include timing information indicating the degree of temporal misalignment between audio and video data included in specific audiovisual blocks. In one embodiment, decision module 230 may include one or more fully connected layers configured to implement a binary classification or a regression value.

Advantageously, synchronization engine 150 can localize synchronization errors to specific portions of a given media title, thereby allowing those synchronization errors to be corrected more easily and thereby improving the overall quality of media titles processed using the above techniques. Additionally, synchronization engine 150 can identify synchronization errors with greater accuracy compared to previous techniques. These technological advantages can improve the operation of a quality control pipeline that detects and corrects synchronization errors in media titles provided by a video streaming service, thereby improving the ability of the video streaming service to provide high quality media content to users.

Identifying Synchronization Errors Across Audiovisual Blocks

FIG. 3 illustrates how a first implementation of the attention module of FIG. 2 can be used to identify audiovisual blocks where synchronization errors occur, according to one embodiment. As shown, synchronization engine 150 includes attention module 220(A). Attention module 220(A) is one possible implementation of attention module 220 of FIG. 2.

In operation, synchronization engine 150 analyzes audiovisual block 1 to generate synchronization data 154(A) using attention module 220(A). In the example shown, audiovisual block 1 includes audio data 300 and video data 310. Audio data 300 and video data 310 correspond to one another. Synchronization engine 150 generates synchronization data 154(A) to indicate specific frames F1 through F4 of video data 310 where audio data 300 is likely to be temporally misaligned. These particular frames may include specific video features that should occur in synchrony with corresponding audio features but do not occur in synchrony with those audio features. For example, frames F2 and F4 could depict a character speaking but audio data 300 could not include speech sounds corresponding to those frames, thereby indicating a synchronization error. The architecture of attention module 220(A) that supports this functionality is described below in conjunction with FIG. 4.

Figure 4:
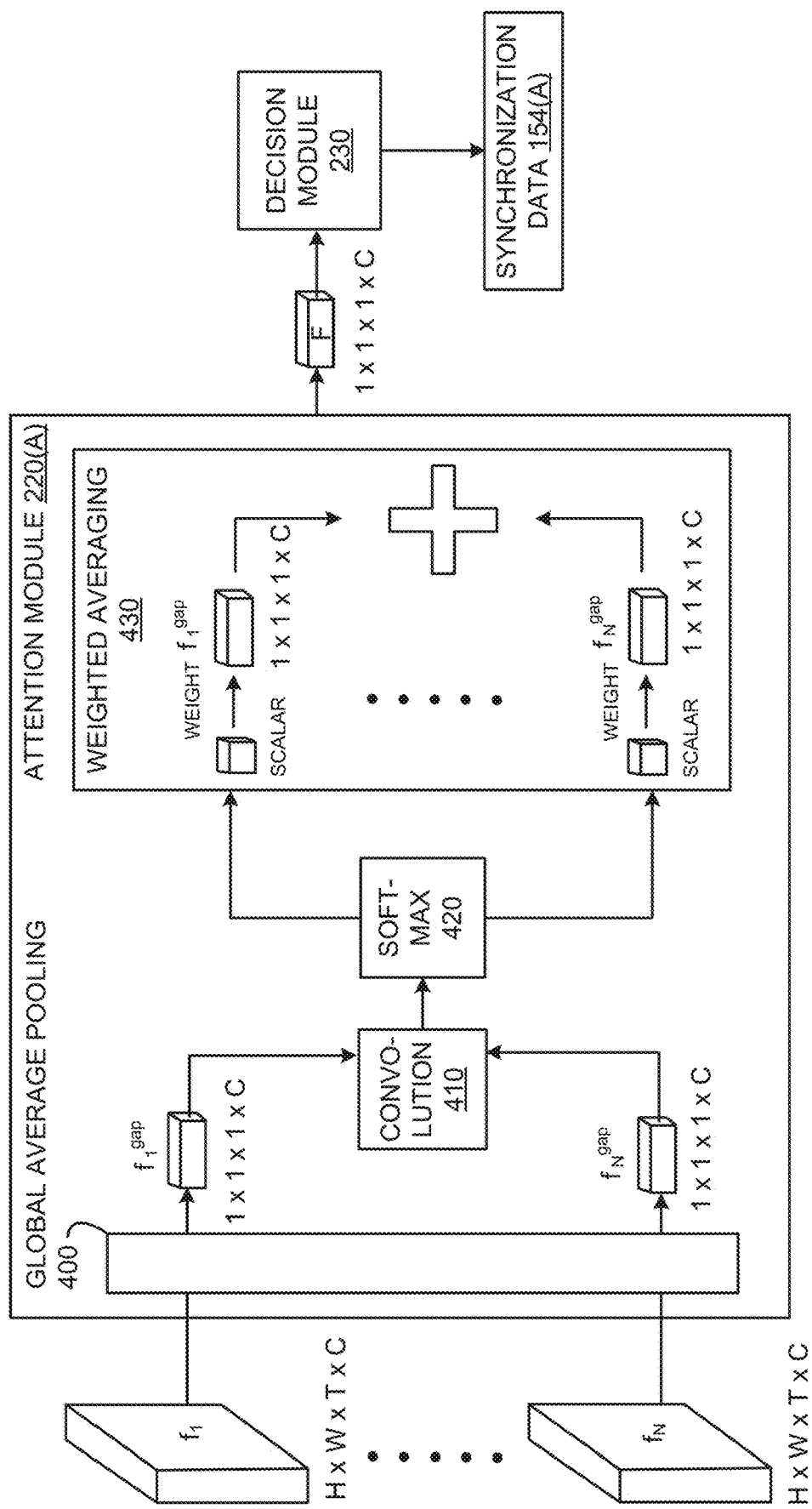
FIG. 4 is a more detailed illustration of the attention module of FIG. 3, according to one embodiment.

FIG. 4 is a more detailed illustration of the attention module of FIG. 3, according to one embodiment. As shown, attention module 220(A) includes various layers, including global average pooling 400, convolution 410, softmax 420, and weighted averaging 430. In operation, global average pooling 400 receives feature maps $f_1$ through $f_N$ from feature extraction module 200 and performs a global average pooling operation with each feature map to generate feature vectors $f_1^{gap}$ through $f_N^{gap}$. Each feature vector $f^{gap}$ has dimensions of $1 \times 1 \times 1 \times C$ and represents the joint audio/video features present in a corresponding audiovisual block. Convolution 410 applies $1 \times 1 \times 1$ convolution layers to feature vectors $f_1^{gap}$ through $f_N^{gap}$ to generate a set of confidence values $c_1$ through $c_N$. Softmax 420 normalizes these confidence values to generate weight values $w_1$ through $w_N$, where each weight value $w_1$ through $w_N$ corresponds to a different audiovisual block 1 through N. Weighted averaging 430 then computes the weighted average of $f_1^{gap}$ through $f_N^{gap}$ using the corresponding weight values $w_1$ through $w_N$ to generate global feature vector F discussed above in conjunction with FIG. 2.

With the architecture set forth above, attention module 220(A) identifies specific joint audio/video features that may be associated with synchronization errors. Based on these joint audio/video features, decision module 230 generates synchronization data 154(A) to indicate one or more of audiovisual blocks 1 through N that include the identified features. The various techniques performed by attention module 220(A) are described in greater detail below in conjunction with FIG. 5.

Figure 5:
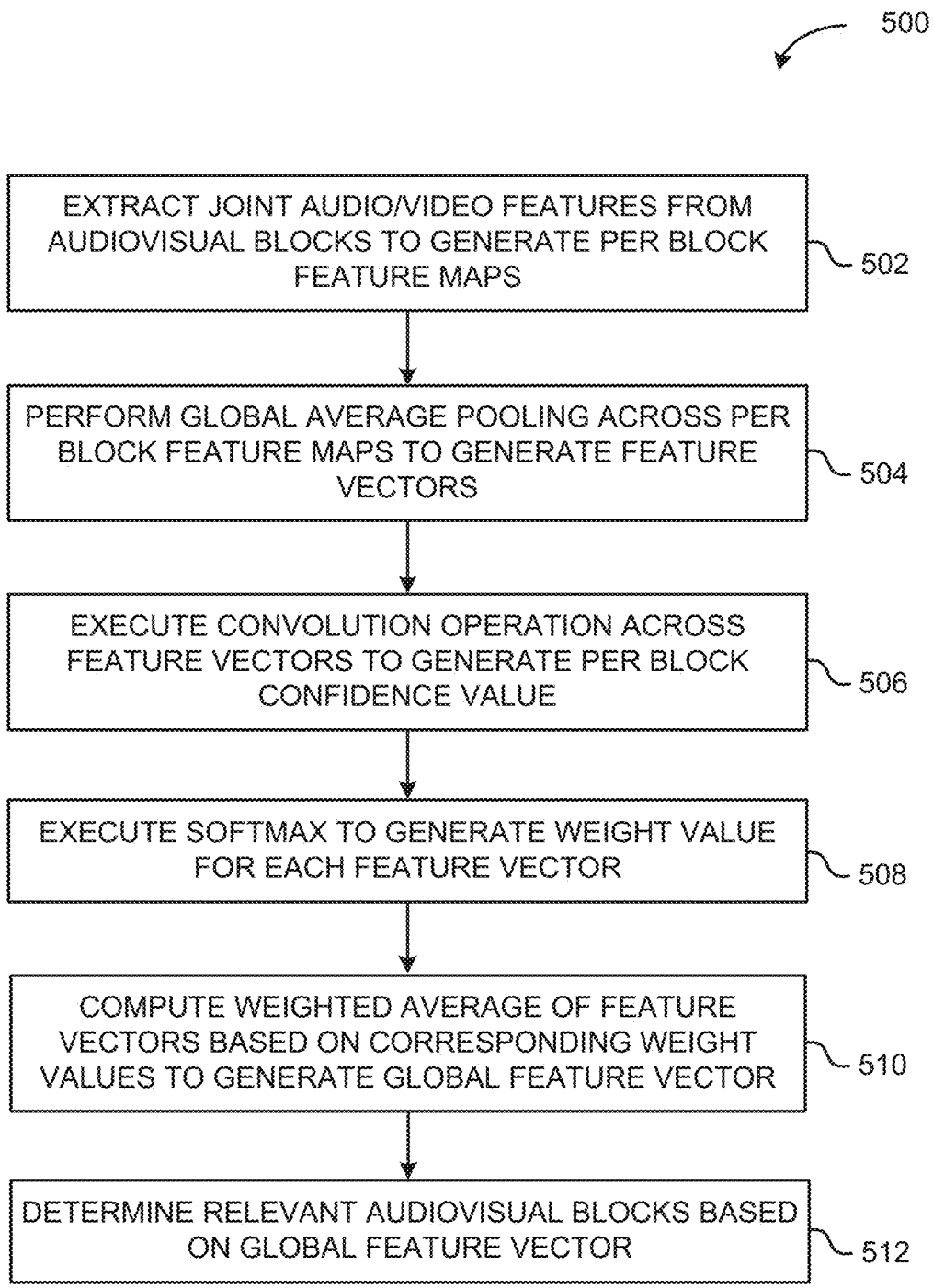
FIG. 5 is a flow diagram of method steps for identifying audiovisual blocks where synchronization errors occur, according to various embodiments.

FIG. 5 is a flow diagram of method steps for identifying audiovisual blocks where synchronization errors occur, according to one embodiment. Although the method steps are described in conjunction with the systems of FIGS. 1-4, persons skilled in the art will understand that any system configured to perform the method steps in any order falls within the scope of the present embodiment.

As shown, a method 500 begins at step 502, where feature extraction module 200 within synchronization engine 150 extracts joint audio/video features from audiovisual blocks 1 through N to generate per block feature maps $f_1$ through $f_N$. Each feature map corresponds to a different audiovisual block 1 through N and generally represents the joint audio/video features present in those audiovisual blocks.

At step 504, global average pooling 400 within attention module 220(A) performs a global average pooling operation across feature maps $f_1$ through $f_N$ to generate feature vectors $f_1^{gap}$ through $f_N^{gap}$. Each feature vector $f^{gap}$ corresponds to a different audiovisual block and indicates the joint audio/video features present in that audiovisual block.

At step 506, convolution 410 executes a convolution operation across feature vectors $f_1^{gap}$ through $f_N^{gap}$ to generate per block confidence values $c_1$ through $c_N$. A given confidence value c generally represents the importance of the corresponding audiovisual block in identifying synchronization errors. In practice, convolution 410 executes $1 \times 1 \times 1$ convolutional layers across feature vectors $f_1^{gap}$ through $f_N^{gap}$, although other convolutional operations can also be performed to generate confidence values $c_1$ through $c_N$.

At step 508, softmax 420 normalizes confidence values $c_1$ through $c_N$ to generate weight values $w_1$ through $w_N$. Each weight value $w_1$ through $w_N$ indicates how strongly a corresponding feature vector $f_1^{gap}$ through $f_N^{gap}$ should be weighted when those feature vectors are combined to form global feature vector F shown in FIG. 2.

At step 510, weighted averaging 430 computes the weighted average of feature vectors $f_1^{gap}$ through $f_N^{gap}$ using the corresponding weight values $w_1$ through $w_N$ computed at step 408 to generate global feature vector F. Global feature vector F indicates the joint audio/visual features included in media title 152 across all audiovisual blocks 1 through N.

At step 512, decision module 230 determines one or more relevant audiovisual blocks based on global feature vector F. In one embodiment, decision module 230 performs a binary classification to identify specific joint audio/visual features that may be related to synchronization errors. Decision module 230 may then identify particular audiovisual blocks that include the identified features. These audiovisual blocks may have an increased likelihood of including synchronization errors.

Referring generally to FIGS. 3-5, the techniques described herein pertain to one implementation of decision module 220 that is shown in FIGS. 3-4 as attention module 220(A). Attention module 220(A) is configured to identify joint audio/video features across different audiovisual blocks. Because each audiovisual block can include one or more frames of video data and corresponding audio data, attention module 220(A) is capable of localizing synchronization errors to one or more frames of video data and corresponding audio data, as also discussed above in conjunction with FIG. 3. Synchronization engine 150 can also include an alternate implementation of attention module 220 that is configured to localize synchronization errors to specific regions of video frames within audiovisual blocks, as described in greater detail below in conjunction with FIGS. 6-8.

Identifying Synchronization Errors within Frames of Audiovisual Blocks

FIG. 6 illustrates how a second implementation of the attention module of FIG. 2 can be used to identify regions of video frames where synchronization errors occur, according to another embodiment. As shown, synchronization engine 150 includes attention module 220(B). Attention module 220(B) is another possible implementation of attention module 220 of FIG. 2.

In operation, synchronization engine 150 analyzes audiovisual block 1 to generate synchronization data 154(B) using attention module 220(B). In like fashion as shown in FIG. 3, in the example shown, audiovisual block 1 includes audio data 300 and video data 310 that correspond to one another. Synchronization engine 150 generates synchronization data 154(B) to indicate specific regions 602 and 604 of frames F2 and F4 of video data 310, respectively, that correspond to a temporal misalignment between audio data 300 and video data 310. These particular regions may include specific video features that should occur in synchrony with corresponding audio features but do not occur in synchrony with those audio features. For example, regions 602 and 604 could correspond to the mouth of a character while the character speaks, but audio data 300 could include no speech sounds corresponding to frames F2 and F4, thereby indicating a synchronization error. The architecture of attention module 220(B) that supports this functionality is described below in conjunction with FIG. 7.

Figure 7:
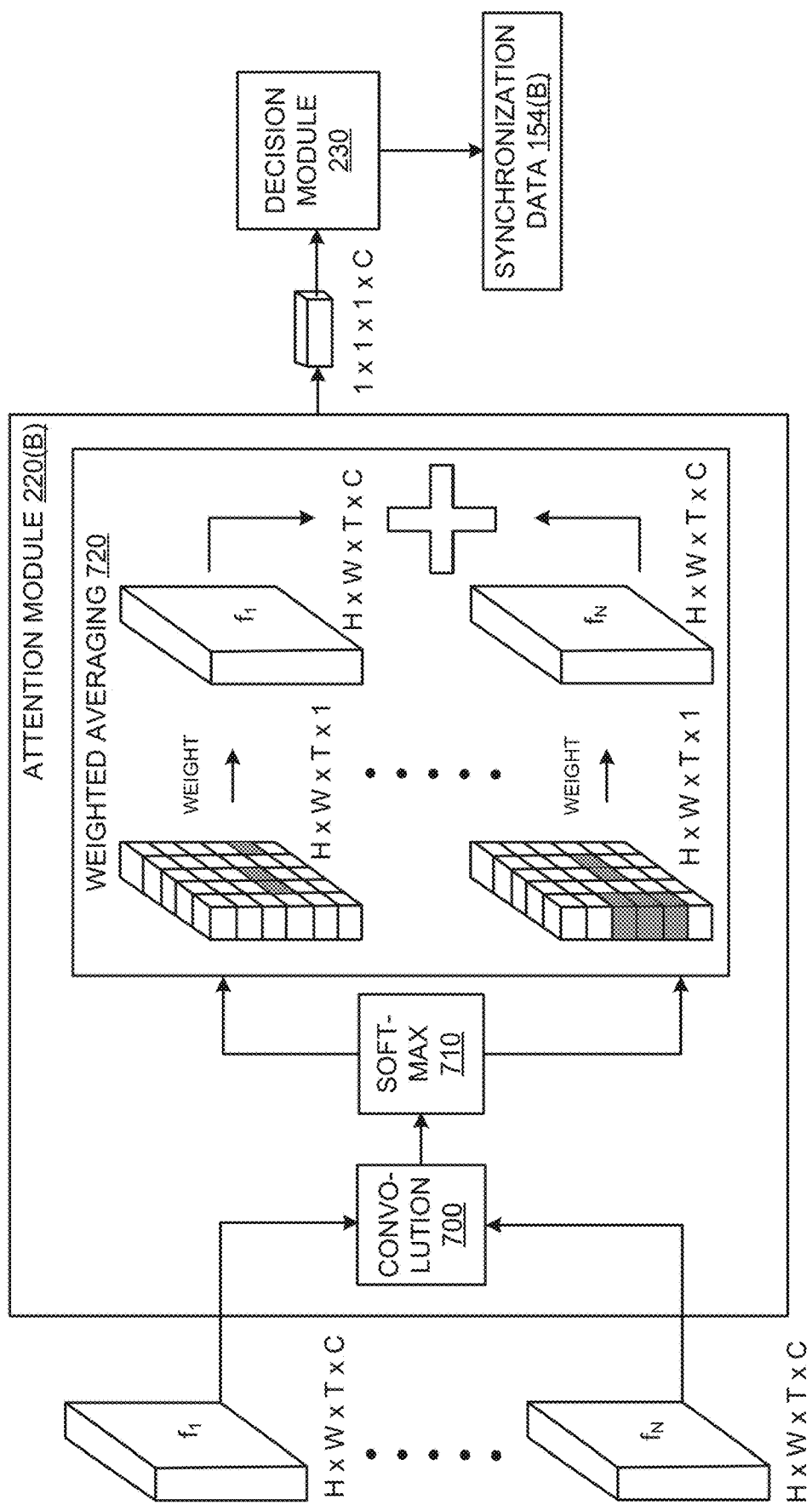
FIG. 7 is a more detailed illustration of the attention module of FIG. 6, according to another embodiment.

FIG. 7 is a more detailed illustration of attention module 220(B) of FIG. 6, according to another embodiment. As shown, attention module 220(B) includes various layers, including convolution 700, softmax 710, and weighted averaging 720. Attention module 220(B) is architecturally similar to attention module 220(A) except that attention module 220(B) does not perform global average pooling and therefore maintains spatial localization of joint audio/video features included in feature maps $f_1$ through $f_N$. In operation, convolution 700 receives feature maps $f_1$ through $f_N$ from feature extraction module 200 and then applies 1×1×1 convolution layers to those feature maps to generate an H×W×T array of confidence values, $c_{H \times W \times T}$, for each feature map $f_1$ through $f_N$. A given array of confidence values indicates the relative importance of each feature included in a corresponding feature map towards localizing synchronization errors. Softmax 710 normalizes the different arrays of confidence values to generate corresponding H×W×T×1 arrays of weight values, $w_{H \times W \times T \times 1}$. Weighted averaging 730 then computes the weighted average across all features set forth in feature maps $f_1$ through $f_N$ using the corresponding arrays of weight values $w_{H \times W \times T \times 1}$, to generate global feature vector F discussed above in conjunction with FIG. 2.

With the architecture set forth above, attention module 220(B) identifies specific joint audio/video features that reside within specific regions of video frames that may be associated with synchronization errors. Based on these joint audio/video features, decision module 230 generates synchronization data 154(B) to indicate regions of video frames within one or more of audiovisual blocks 1 through N that include the identified features. The various techniques performed by attention module 220(B) are described in greater detail below in conjunction with FIG. 8.

Figure 8:
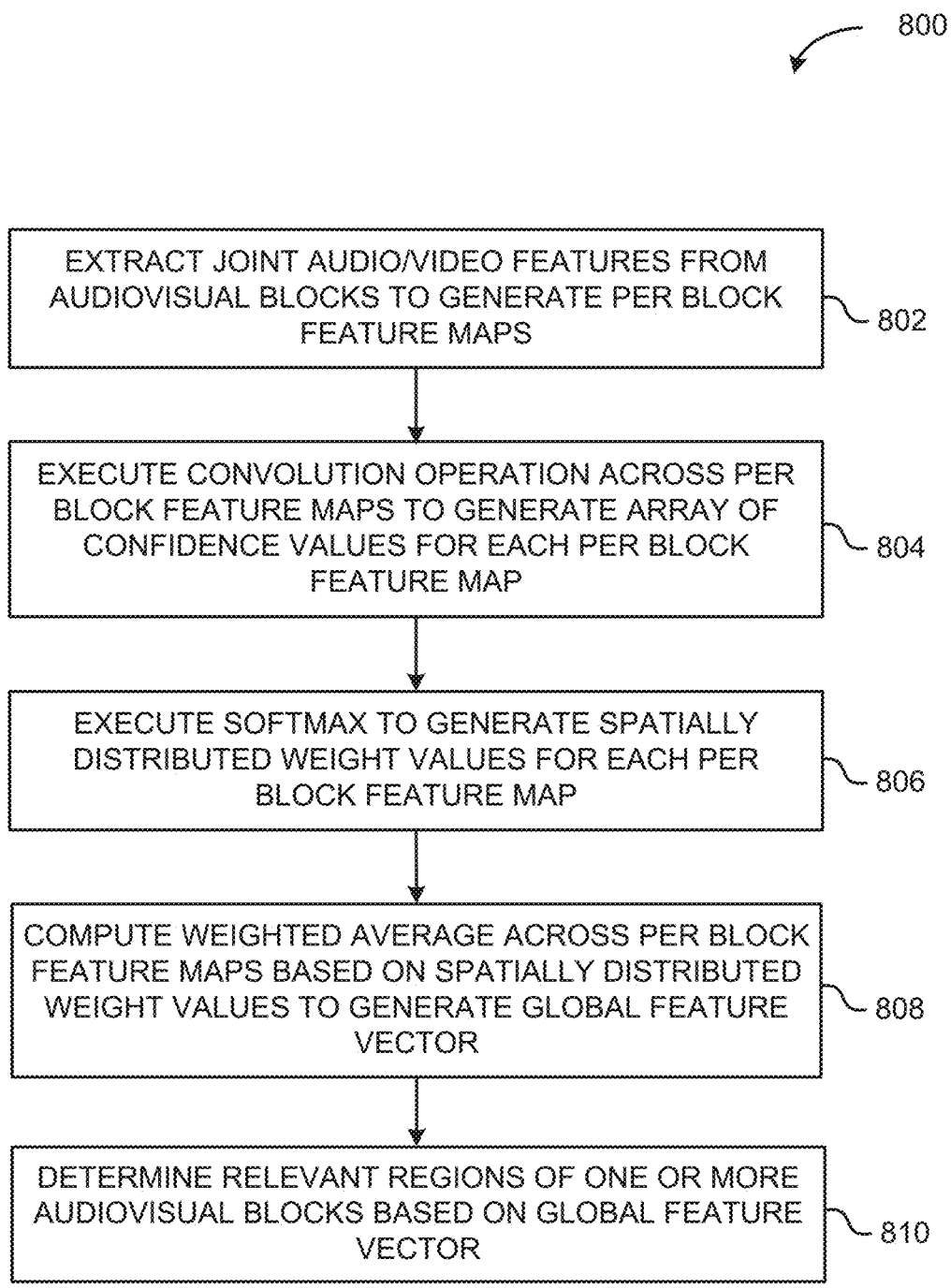
FIG. 8 is a flow diagram of method steps for identifying regions of video frames where synchronization errors occur, according to another embodiment.

FIG. 8 is a flow diagram of method steps for identifying regions of video frames where synchronization errors occur, according to another embodiment. Although the method steps are described in conjunction with the systems of FIGS. 1-2 and 6-7, persons skilled in the art will understand that any system configured to perform the method steps in any order falls within the scope of the present embodiments.

As shown, a method 800 begins at step 802, where feature extraction module 200 within synchronization engine 150 extracts joint audio/video features from audiovisual blocks 1 through N to generate feature maps $f_1$ through $f_N$. Step 802 of the method 502 is substantially similar to step 502 of the method 500. Each feature map generated at step 802 corresponds to a different audiovisual block 1 through N and generally represents the joint audio/visual features present in those audiovisual blocks.

At step 804, convolution 700 within attention module 220(B) executes a 1×1×1 convolution operation across feature maps $f_1$ through $f_N$ generated at step 802 to generate an H×W×T array of confidence values for each per block feature map, denoted $c_{H \times W \times T}$ in FIG. 7. Each confidence value within a given array of confidence values corresponds to a specific feature included in an associated feature map f and indicates the relative importance of the specific feature in localizing synchronization errors to a region of a given video frame that includes the specific feature.

At step 806, softmax 710 normalizes the different arrays of confidence values to generate corresponding H×W=T×1 arrays of weight values, $w_{H \times W \times T \times 1}$. In doing so, softmax 710 enforces a probabilistic distribution to the arrays of confidence values in order to maintain consistency with a range of values associated with global feature vector F.

At step 808, weighted averaging 730 computes the weighted average across all features set forth in feature maps $f_1$ through $f_N$ using the corresponding arrays of weight values $w_{H \times W \times T \times 1}$, to generate global feature vector F discussed above in conjunction with FIG. 2. Global feature vector F indicates the joint audio/visual features included in media title 152 within individual video frames of audiovisual blocks 1 through N.

At step 810, decision module 230 determines relevant regions of one or more audiovisual blocks based on global feature vector F generated at step 808. In one embodiment, decision module 230 may analyze specific regions of each frame of audiovisual blocks 1 through N to identify the occurrence of one or more features set forth in feature vector F.

Referring generally to FIGS. 6-8, the techniques described herein pertain to one implementation of decision module 220 that is shown in FIGS. 6-7 as attention module 220(B). Attention module 220(B) is configured to identify joint audio/video features within regions of video frames of different audiovisual blocks. Accordingly, attention module 220(B) is capable of localizing synchronization errors to spatial regions within individual frames of video data.

Referring generally to FIGS. 1-8, in one embodiment, synchronization engine 150 may be configured to generate synchronization data 154 to include a misalignment metric that quantifies the degree of misalignment between audio data and video data included in media title 152. Synchronization engine 150 may generate a title-level misalignment metric for media title 152 as a whole, a block-level misalignment metric for specific audiovisual blocks, or a frame-level misalignment metric for particular regions of individual video frames. To generate a given misalignment metric, decision module 230 within synchronization engine 150 is configured to output a regression value instead of a binary classification and synchronization engine 150 is trained using a regression objective, such as mean-squared error.

In various embodiments, synchronization engine 150 may be configured to identify joint audio/video features that represent specific types of audio features and corresponding video features that should be played back in synchrony with one another in the absence of synchronization errors. A given audio feature may correspond to one or more audio samples, while a given video feature may correspond to one or more groups of pixels. For example, synchronization engine 150 could be configured to identify a first joint audio/video feature that is derived from an audio feature corresponding to the sound of speech and a video feature corresponding to one or more images of a person speaking. In another example, synchronization engine 150 could be configured to identify a second joint audio/video feature that is derived from an audio feature corresponding to the sound of two objects colliding and a video feature corresponding to one or more images of the two objects colliding. In either of these two examples, the audio feature corresponding to a sound should occur in conjunction with a video feature depicting an event that should cause that sound, and the presence of an associated joint audio/video feature is therefore indicative of a lack of synchronization errors.

Synchronization engine 150 may also be configured to identify joint audio/video features that represent specific types of audio features and corresponding video features that should not be played back in synchrony with one another in the absence of synchronization errors. For example, synchronization engine 150 could be configured to identify a first joint audio/video feature that is derived from an audio feature corresponding to silence and a video feature corresponding to one or more images of a person speaking. In another example, synchronization engine 150 could be configured to identify a second joint audio/video feature that is derived from an audio feature corresponding to silence and a video feature corresponding to one or more images of two objects colliding. In either of these two examples, the audio feature corresponding to silence should not occur in conjunction with a video feature depicting an event that should cause sound, and the presence of an associated joint audio/video feature is therefore indicative of one or more synchronization errors.

In sum, various embodiments include a neural network system that is trained to identify one or more portions of a media title where synchronization errors are likely to be present. The neural network system is trained based on a first set of media titles where synchronization errors are present and a second set of media titles where synchronization errors are absent. The second set of media titles can be generated by introducing synchronization errors into a set of media titles that otherwise lack synchronization errors. Via training, the neural network system learns to identify specific visual features included in one or more video frames and corresponding audio features that should be played back in synchrony with the associated visual features. Accordingly, when presented with a media title that includes synchronization errors, the neural network can indicate the specific frames where synchronization errors are likely to be present.

One technical advantage of the disclosed techniques relative to the prior art is that the disclosed techniques enable the precise location of synchronizations errors within a given media title to be determined. Accordingly, synchronization errors can be more effectively corrected than currently possible with existing algorithmic techniques for detecting synchronization errors, potentially leading to higher quality media titles and therefore higher overall user engagement. Another technical advantage of the disclosed techniques relative to the prior art is that synchronization errors can be detected with much higher accuracy than possible with current algorithmic techniques for identifying synchronization errors. Accordingly, more synchronization errors within a given media title can be identified and corrected with fewer false positives compared to existing algorithmic techniques, further improving the quality of media titles provided by the video streaming service. These technical advantages represent one or more technological advancements over prior art approaches.

1. Some embodiments include a neural network system implemented by one or more computers, wherein the neural network system identifies one or more blocks in a media clip that include audio data that is misaligned with corresponding video data, wherein the neural network system comprises a convolutional subnetwork that generates, for each block included in a plurality of blocks in the media clip, a corresponding feature map derived from one or more audio features and one or more video features of the block of the media clip, an attention module that computes at least one weight value for each feature map generated for the plurality of blocks in the media clip, wherein the at least one weight value computed for each feature map indicates a likelihood that a given block of the media clip corresponding to the feature map includes audio data that is misaligned with corresponding video data, and an output layer that identifies, based on the at least one weight value computed for each feature map, a first block included in the plurality of blocks that includes first audio data that is misaligned with corresponding first video data.

2. The neural network system of clause 1, wherein the convolutional subnetwork comprises a plurality of three-dimensional convolutional networks that share a first set of weights, wherein each three-dimensional convolutional network included in the plurality of three-dimensional convolutional networks includes one or more audio feature extraction layers, one or more video feature extraction layers, and one or more joint audio/video extraction layers.

3. The neural network system of any of clauses 1-2, wherein the attention module comprises a convolution layer that performs one or more convolution operations with each feature map to generate at least one confidence value for each feature map, a softmax layer that generates the at least one weight value for each feature map based on the at least one confidence value computed for each feature map, wherein the softmax layer performs a normalization operation with each feature map to generate the at least one weight value for each feature map, and a weighted averaging layer that generates a global feature vector for the media clip based on the at least one weight value generated for each feature map, wherein the global feature vector indicates that the first block in the plurality of blocks includes the first audio data that is misaligned with the corresponding first video data.

4. The neural network system of any of clauses 1-3, wherein the attention module further comprises a global pooling layer that generates a different feature vector for each feature map, wherein the convolution layer computes the at least one confidence value for the feature map based on a corresponding feature vector, and wherein the global feature vector indicates a first region within the first block in the plurality of blocks where the first audio data is misaligned with the corresponding first video data.

5. The neural network system of any of clauses 1-4, wherein the output layer includes one or more fully connected layers that perform a binary classification based on the at least one weight value computed for each feature map to generate a first classification for the first block, wherein the first classification indicates that the first audio data is misaligned with the corresponding first video data.

6. The neural network system of any of clauses 1-5, wherein a first feature map derived from the one or more audio features and the one or more video features includes a first joint audio/visual feature that is derived from a first audio feature and a first video feature.

7. The neural network system of any of clauses 1-6, wherein the first audio feature corresponds to a first sound that is played during playback of the media clip, the first video feature corresponds to a first event that is depicted during playback of the media clip, and the first sound is played back in conjunction with the first event in the absence of misalignment between audio data and corresponding video data.

8. The neural network system of any of clauses 1-7, wherein the first audio feature corresponds to a first sound that is played during playback of the media clip, the first video feature corresponds to a first event that is depicted during playback of the media clip, and the first sound is not played back in conjunction with the first event in the presence of misalignment between audio data and corresponding video data.

9. The neural network system of any of clauses 1-8, wherein the first video feature corresponds to a first intersection between a first set of pixels and a second set of pixels, and the first audio feature corresponds to a sound associated with the first intersection.

10. The neural network system of any of clauses 1-9, wherein at least one of the convolutional subnetwork, the attention module, or the output layer is trained based on a first set of media clips that do not include misalignment between audio data and corresponding video data and a second set of media clips that include misalignment between audio data and corresponding video data.

11. Some embodiments include a computer-implemented method, comprising identifying, via a neural network, one or more blocks in a media clip that include audio data that is misaligned with corresponding video data, wherein the neural network is configured to generate, for each block included in a plurality of blocks in the media clip, a corresponding feature map derived from one or more audio features and one or more video features of the block of the media clip, compute at least one weight value for each feature map generated for the plurality of blocks in the media clip, wherein the at least one weight value computed for each feature map indicates a likelihood that a given block of the media clip includes audio data that is misaligned with corresponding video data, and identify, based on the at least one weight value computed for each feature map, a first block included in the plurality of blocks that includes first audio data that is misaligned with corresponding first video data.

12. The computer-implemented method of clause 11, further comprising performing one or more convolution operations with each feature map to generate at least one confidence value for each feature map, generating the at least one weight value for each feature map based on the at least one confidence value computed for each feature map, wherein a softmax layer performs a normalization operation with each feature map to generate the at least one weight value for each feature map, and generating a global feature vector for the media clip based on the at least one weight value generated for each feature map, wherein the global feature vector indicates that the first block in the plurality of blocks includes the first audio data that is misaligned with the corresponding first video data.

13. The computer-implemented method of any of clauses 11-12, further comprising generating, via global average pooling, a different feature vector for each feature map, wherein computing the at least one confidence value for the feature map is performed based on a corresponding feature vector, and wherein the global feature vector indicates a first region within the first block in the plurality of blocks where the first audio data is misaligned with the corresponding first video data.

14. The computer-implemented method of any of clauses 11-13, wherein a first feature map derived from the one or more audio features and the one or more video features includes a first joint audio/visual feature that is derived from a first audio feature and a first video feature.

15. The computer-implemented method of any of clauses 11-14, wherein the first audio feature corresponds to a first sound that is played during playback of the media clip, the first video feature corresponds to a first event that is depicted during playback of the media clip, and the first sound is played back in conjunction with the first event in the absence of misalignment between audio data and corresponding video data.

16. Some embodiments include a non-transitory computer-readable medium storing program instructions that, when executed by a processor, cause the processor to perform the steps of generating, for each block included in a plurality of blocks in a media clip, a corresponding feature map derived from one or more audio features and one or more video features of the block of a media clip, computing at least one weight value for each feature map generated for the plurality of blocks in the media clip, wherein the at least one weight value computed for the feature map indicates a likelihood that a given block of the media clip includes audio data that is misaligned with corresponding video data, and identifying, based on the at least one weight value computed for each feature map, a first block included in the plurality of blocks that includes first audio data that is misaligned with corresponding first video data.

17. The non-transitory computer-readable medium of clause 16, wherein the first audio feature corresponds to a first sound that is played during playback of the media clip, the first video feature corresponds to a first event that is depicted during playback of the media clip, and the first sound is played back in conjunction with the first event in the absence of misalignment between audio data and corresponding video data.

18. The non-transitory computer-readable medium of any of clauses 16-17, wherein the first audio feature corresponds to a first sound that is played during playback of the media clip, the first video feature corresponds to a first event that is depicted during playback of the media clip, and the first sound is not played back in conjunction with the first event in the presence of misalignment between audio data and corresponding video data.

19. The non-transitory computer-readable medium of any of clauses 16-18, wherein the first video feature corresponds to a first intersection between a first set of pixels and a second set of pixels, and the first audio feature corresponds to a sound associated with the first intersection.

20. The non-transitory computer-readable medium of any of clauses 16-19, further comprising the step of training a neural network to identify the first block based on a first set of media clips that do not include misalignment between audio data and corresponding video data and a second set of media clips that include misalignment between audio data and corresponding video data.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A neural network system implemented by one or more computers,
    wherein the neural network system identifies one or more blocks in a media clip that include audio data that is misaligned with corresponding video data,
    wherein the neural network system comprises:
        a convolutional subnetwork that generates a plurality of feature maps by generating, for each block included in a plurality of blocks in the media clip, a corresponding feature map derived from both one or more audio features and also one or more video features of the block in the media clip;
        an attention module that:
            computes a first set of data based on the plurality of feature maps;
            executes one or more convolution operations to compute a plurality of confidence values corresponding to the plurality of blocks in the media clip based on the first set of data;
            generates a plurality of weight values corresponding to the plurality of blocks based on the plurality of confidence values; and
            computes a weighted average based on the plurality of weight values to generate a global feature vector; and
        an output layer that identifies, based on the global feature vector from the attention module, a first block included in the plurality of blocks that includes first audio data that is misaligned with corresponding first video data.

2. The neural network system of claim 1, wherein the convolutional subnetwork comprises:
    a plurality of three-dimensional convolutional networks that share a first set of weights, wherein each three-dimensional convolutional network included in the plurality of three-dimensional convolutional networks includes one or more audio feature extraction layers, one or more video feature extraction layers, and one or more joint audio/video extraction layers.

3. The neural network system of claim 1, wherein the attention module comprises:
    a convolution layer that performs the one or more convolution operations on the first set of data to generate the plurality of confidence values;
    a softmax layer that generates the plurality of weight values based on the plurality of confidence values, wherein the softmax layer performs a normalization operation on the plurality of confidence values to generate the plurality of weight values; and
    a weighted averaging layer that generates the global feature vector for the media clip based on the plurality of weight values, wherein the global feature vector indicates that the first block in the plurality of blocks includes the first audio data that is misaligned with the corresponding first video data.

4. The neural network system of claim 3, wherein the attention module further comprises:
a global pooling layer that generates a different feature vector for each feature map included in the plurality of feature maps to produce the first set of data, wherein the convolution layer computes each confidence value included in the plurality of confidence values based on a corresponding feature vector, and wherein the global feature vector indicates a first region within the first block in the plurality of blocks where the first audio data is misaligned with the corresponding first video data.

5. The neural network system of claim 1, wherein the output layer includes one or more fully connected layers that perform a binary classification based on the plurality of weight values to generate a first classification for the first block, wherein the first classification indicates that the first audio data is misaligned with the corresponding first video data.

6. The neural network system of claim 1, wherein a first feature map corresponding to the first block of the plurality of blocks includes a first joint audio/visual feature that is derived from a first audio feature and a first video feature.

7. The neural network system of claim 6, wherein the first audio feature corresponds to a first sound that is played during playback of the media clip, the first video feature corresponds to a first event that is depicted during playback of the media clip, and the first sound is played back in conjunction with the first event in the absence of misalignment between audio data and corresponding video data.

8. The neural network system of claim 6, wherein the first audio feature corresponds to a first sound that is played during playback of the media clip, the first video feature corresponds to a first event that is depicted during playback of the media clip, and the first sound is not played back in conjunction with the first event in the presence of misalignment between audio data and corresponding video data.

9. The neural network system of claim 6, wherein the first video feature corresponds to a first intersection between a first set of pixels and a second set of pixels, and the first audio feature corresponds to a sound associated with the first intersection.

10. The neural network system of claim 1, wherein at least one of the convolutional subnetwork, the attention module, or the output layer is trained based on a first set of media clips that do not include misalignment between audio data and corresponding video data and a second set of media clips that include misalignment between audio data and corresponding video data.

11. The neural network system of claim 1, wherein the attention module comprises a softmax layer that performs a normalization operation on the plurality of confidence values to generate the plurality of weight values.

12. A computer-implemented method, comprising:
identifying, via a neural network, one or more blocks in a media clip that include audio data that is misaligned with corresponding video data, wherein the neural network is configured to:
generate a plurality of feature maps by generating, for each block included in a plurality of blocks in the media clip, a corresponding feature map derived from both one or more audio features and also one or more video features of the block in the media clip,
compute a first set of data based on the plurality of feature maps,
execute one or more convolution operations to compute a plurality of confidence values corresponding to the plurality of blocks in the media clip,
generate a plurality of weight values corresponding to the plurality of blocks based on the plurality of confidence values,
compute a weighted average based on the plurality of weight values to generate a global feature vector, and
identify, based on the global feature vector, a first block included in the plurality of blocks that includes first audio data that is misaligned with corresponding first video data.

13. The computer-implemented method of claim 12, further comprising:
performing the one or more convolution operations on the first set of data to generate the plurality of confidence values;
generating the plurality of weight values based on the plurality of confidence values computed, wherein a softmax layer performs a normalization operation on the plurality of confidence values to generate the plurality of weight values; and
generating the global feature vector for the media clip based on the plurality of weight values generated, wherein the global feature vector indicates that the first block in the plurality of blocks includes the first audio data that is misaligned with the corresponding first video data.

14. The computer-implemented method of claim 13, further comprising generating, via global average pooling, a different feature vector for each feature map included in the plurality of feature maps to produce the first set of data, wherein computing each confidence value included in the plurality of confidence values is performed based on a corresponding feature vector, and wherein the global feature vector indicates a first region within the first block in the plurality of blocks where the first audio data is misaligned with the corresponding first video data.

15. The computer-implemented method of claim 12, wherein a first feature map corresponding to the first block of the plurality of blocks includes a first joint audio/visual feature that is derived from a first audio feature and a first video feature.

16. The computer-implemented method of claim 15, wherein the first audio feature corresponds to a first sound that is played during playback of the media clip, the first video feature corresponds to a first event that is depicted during playback of the media clip, and the first sound is played back in conjunction with the first event in the absence of misalignment between audio data and corresponding video data.

17. A non-transitory computer-readable medium storing program instructions that, when executed by a processor, cause the processor to perform the steps of:
generating a plurality of feature maps by generating, for each block included in a plurality of blocks in a media clip, a corresponding feature map derived from both one or more audio features and also one or more video features of the block in the media clip;
computing a first set of data based on the plurality of feature maps;
executing one or more convolution operations to compute a plurality of confidence values corresponding to the plurality of blocks in the media clip;
generating a plurality of weight values corresponding to the plurality of blocks based on the plurality of confidence values;

computing a weighted average based on the plurality of weight values to generate a global feature vector; and identifying, based on the global feature vector, a first block included in the plurality of blocks that includes first audio data that is misaligned with corresponding first video data.

18. The non-transitory computer-readable medium of claim 17, wherein a first audio feature corresponds to a first sound that is played during playback of the media clip, a first video feature corresponds to a first event that is depicted during playback of the media clip, and the first sound is played back in conjunction with the first event in the absence of misalignment between audio data and corresponding video data.

19. The non-transitory computer-readable medium of claim 18, wherein the first audio feature corresponds to a first sound that is played during playback of the media clip, the first video feature corresponds to a first event that is depicted during playback of the media clip, and the first sound is not played back in conjunction with the first event in the presence of misalignment between audio data and corresponding video data.

20. The non-transitory computer-readable medium of claim 18, wherein the first video feature corresponds to a first intersection between a first set of pixels and a second set of pixels, and the first audio feature corresponds to a sound associated with the first intersection.

21. The non-transitory computer-readable medium of claim 17, wherein the program instructions further comprise program instructions that, when executed by the processor, cause the processor to perform a step of training a neural network to identify the first block based on a first set of media clips that do not include misalignment between audio data and corresponding video data and a second set of media clips that include misalignment between audio data and corresponding video data.

\* \* \* \* \*

UNITED STATES PATENT AND TRADEMARK OFFICE
CERTIFICATE OF CORRECTION

| | | |
|---|---|---|
| PATENT NO. | : 12,334,118 B2 | Page 1 of 1 |
| APPLICATION NO. | : 16/687209 | |
| DATED | : June 17, 2025 | |
| INVENTOR(S) | : Rohit Puri, Naji Khosravan and Shervin Ardeshir Behrostaghi | |

It is certified that error appears in the above-identified patent and that said Letters Patent is hereby corrected as shown below:

In the Claims

Column 18, Claim 13, Line 19, please delete "computed";

Column 18, Claim 13, Line 24, please delete "generated".

Signed and Sealed this
Twenty-sixth Day of August, 2025

Coke Morgan Stewart
*Acting Director of the United States Patent and Trademark Office*